(12) United States Patent
Wong et al.

(10) Patent No.: US 8,567,745 B2
(45) Date of Patent: Oct. 29, 2013

(54) APPARATUSES AND SYSTEMS WITH VERTICALLY AND LONGITUDINALLY OFFSET MOUNTING FLANGES

(75) Inventors: Joey Wong, Enfield, CT (US); Constantino V. Loffredo, Newington, CT (US); Fernando K. Grant, South Windsor, CT (US)

(73) Assignee: United Technologies Corporation, Hartford, CT (US)

( * ) Notice: Subject to any disclaimer, the term of this patent is extended or adjusted under 35 U.S.C. 154(b) by 53 days.

(21) Appl. No.: 13/327,355

(22) Filed: Dec. 15, 2011

(65) Prior Publication Data
US 2013/0153739 A1    Jun. 20, 2013

(51) Int. Cl.
*F16M 1/00*    (2006.01)

(52) U.S. Cl.
USPC ............... 248/554; 248/674; 60/797; 244/54

(58) Field of Classification Search
USPC ................ 248/554, 674; 60/797; 123/195 A; 244/54
See application file for complete search history.

(56) References Cited

U.S. PATENT DOCUMENTS

| | | | |
|---|---|---|---|
| 3,891,345 A | 6/1975 | Doolin | |
| 4,151,822 A * | 5/1979 | Miura et al. | 123/195 A |
| 4,202,539 A * | 5/1980 | Polastri et al. | 269/70 |
| D368,187 S * | 3/1996 | Johnson | D6/466 |
| 5,524,847 A | 6/1996 | Brodell et al. | |
| 5,685,140 A | 11/1997 | Clements et al. | |
| 5,685,142 A | 11/1997 | Brewer et al. | |
| 5,778,659 A | 7/1998 | Duesler et al. | |
| 5,833,140 A | 11/1998 | Loffredo et al. | |
| 6,318,070 B1 | 11/2001 | Rey et al. | |
| 6,935,591 B2 * | 8/2005 | Udall | 244/54 |
| 7,607,609 B2 * | 10/2009 | Levert | 244/54 |
| 7,909,300 B2 * | 3/2011 | Kidder et al. | 248/346.5 |
| 7,918,433 B2 | 4/2011 | Melton et al. | |
| 7,938,359 B2 * | 5/2011 | Guibert et al. | 244/54 |
| 7,950,604 B2 * | 5/2011 | Combes et al. | 244/54 |
| 8,128,021 B2 * | 3/2012 | Suciu et al. | 244/54 |
| 8,146,856 B2 * | 4/2012 | Combes et al. | 244/54 |
| 8,152,094 B2 * | 4/2012 | Foster | 244/54 |
| 8,256,707 B2 * | 9/2012 | Suciu et al. | 244/54 |
| 8,413,925 B2 * | 4/2013 | Martinou et al. | 244/54 |
| 2004/0134198 A1 | 7/2004 | Mitchell et al. | |
| 2008/0236136 A1 | 10/2008 | Loffredo | |
| 2009/0260365 A1 | 10/2009 | Muldoon et al. | |

(Continued)

OTHER PUBLICATIONS

International search report for PCT/US2012/060220 dated Aug. 12, 2013.

*Primary Examiner* — Terrell McKinnon
*Assistant Examiner* — Daniel J Breslin
(74) *Attorney, Agent, or Firm* — O'Shea Getz P.C.

(57) ABSTRACT

A flanged apparatus includes an apparatus body and a flanged mount, which includes a support pylon, a first mounting flange and a second mounting flange. The support pylon includes a first pylon segment, a second pylon segment and a routing notch. The first pylon segment is cantilevered from the apparatus body, and extends to the first mounting flange. The second pylon segment is cantilevered from the first pylon support, and extends from the first mounting flange to the second mounting flange. The routing notch extends vertically between the first pylon segment and the second pylon segment. The first mounting flange and the second mounting flange extend laterally from the support pylon, and the first mounting flange is separated from the second mounting flange by a longitudinal distance and a vertical distance.

18 Claims, 3 Drawing Sheets

(56) References Cited

U.S. PATENT DOCUMENTS

| | | | |
|---|---|---|---|
| 2009/0321608 A1* | 12/2009 | Melton et al. | 248/674 |
| 2010/0050643 A1 | 3/2010 | Snyder et al. | |
| 2010/0307165 A1 | 12/2010 | Wong et al. | |
| 2011/0138773 A1 | 6/2011 | Hernandez et al. | |
| 2012/0324907 A1* | 12/2012 | Waldron et al. | 60/797 |

* cited by examiner

APPARATUSES AND SYSTEMS WITH VERTICALLY AND LONGITUDINALLY OFFSET MOUNTING FLANGES

This invention was made with government support under Contract No. F33657-99-D-2051-0017 awarded by the United States Air Force. The government may have certain rights in the invention.

BACKGROUND OF THE INVENTION

1. Technical Field

The present invention relates generally to a flanged apparatus and system and, in particular, to a flanged mount including a first mounting flange and a second mounting flange that is vertically and longitudinally offset from the first mounting flange.

2. Background Information

A trailing edge box for a typical gas turbine engine augmentor, for example, may include a flanged mount connected to a trailing edge box body. The flanged mount may include a support pedestal that extends radially from the trailing edge box body to a planar mounting plate. The mounting plate may extend axially from a first side of the support pedestal thereby forming a first mounting flange. The mounting plate may also extend axially away from an opposite second side of the support pedestal thereby forming a second mounting flange. Such planar mounting flanges, however, may prevent the flanged mount from being routed through a mounting aperture in an augmentor duct case during assembly where, for example, the mounting aperture has an axial length less than an axial length of the mounting plate.

SUMMARY OF THE DISCLOSURE

According to a first aspect of the invention, a flanged apparatus includes an apparatus body and a flanged mount, which includes a support pylon, a first mounting flange and a second mounting flange. The support pylon includes a first pylon segment, a second pylon segment and a routing notch. The first pylon segment is cantilevered from the apparatus body, and extends to the first mounting flange. The second pylon segment is cantilevered from the first pylon support, and extends from the first mounting flange to the second mounting flange. The routing notch extends vertically between the first pylon segment and the second pylon segment. The first mounting flange and the second mounting flange extend laterally from the support pylon, and the first mounting flange is separated from the second mounting flange by a longitudinal distance and a vertical distance.

According to a second aspect of the invention, a flanged assembly includes a first apparatus and a flanged second apparatus with a flanged mount extending vertically from an apparatus body. The first apparatus includes an aperture with a first longitudinal length that is mated with the flanged mount. The flanged mount has a second longitudinal length, and includes a support pylon, a first mounting flange and a second mounting flange. The support pylon includes a first pylon segment that is cantilevered from the apparatus body, a second pylon segment that is cantilevered from the first pylon support, and a routing notch that extends vertically between the first pylon segment and the second pylon segment. The first pylon segment extends through the aperture to the first mounting flange. The second pylon segment extends from the first mounting flange to the second mounting flange. The first mounting flange and the second mounting flange extend laterally from the support pylon, and the first mounting flange is separated from the second mounting flange by a longitudinal distance and a vertical distance. The second longitudinal length extends from respective outside ends of the first mounting flange and the second mounting flange, and is greater than the first longitudinal length.

The foregoing features and the operation of the invention will become more apparent in light of the following description and the accompanying drawings.

DETAILED DESCRIPTION OF THE INVENTION

Figure 1:
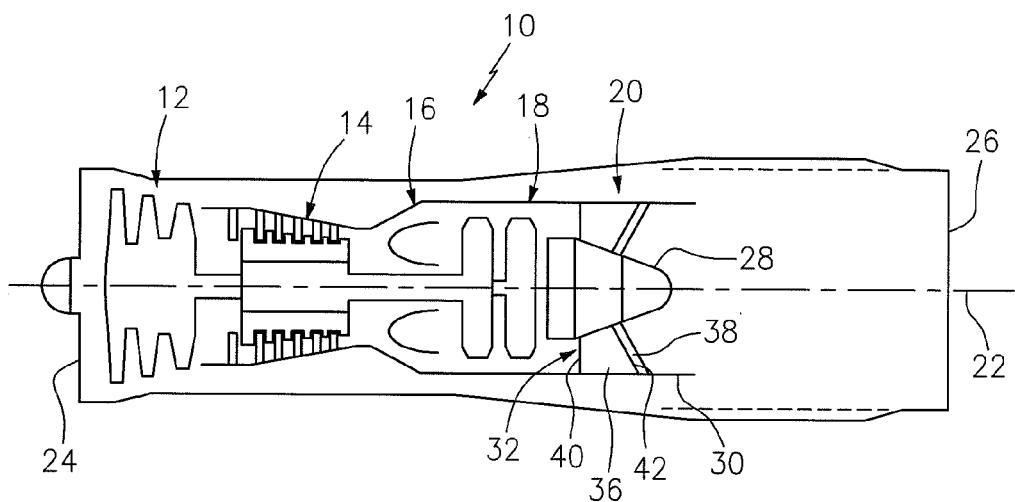
FIG. 1 is a side-sectional illustration of a gas turbine engine.

FIG. 1 illustrates a gas turbine engine 10 that includes a fan 12, a compressor 14, a combustor 16, a turbine 18, and an augmentor 20 sequentially arranged along an engine axis 22 between a forward engine airflow inlet 24 and an aft engine airflow exhaust 26. The augmentor 20 may include an annular inner duct case 28, an annular outer duct case 30, one or more vanes 32 and an augmentor fuel delivery system 34 (see FIGS. 2 and 3).

Each vane 32 may extend radially from the inner duct case 28 to the outer duct case 30. Each vane 32 may include a vane airfoil 36 and a trailing edge box 38 (a type of flanged apparatus). The vane airfoil 36 extends between an airfoil leading edge 40 and an airfoil trailing edge 42. The trailing edge box 38 may be connected to the airfoil trailing edge 42 and to the outer duct case 30, which will be described below in further detail.

Figure 4:
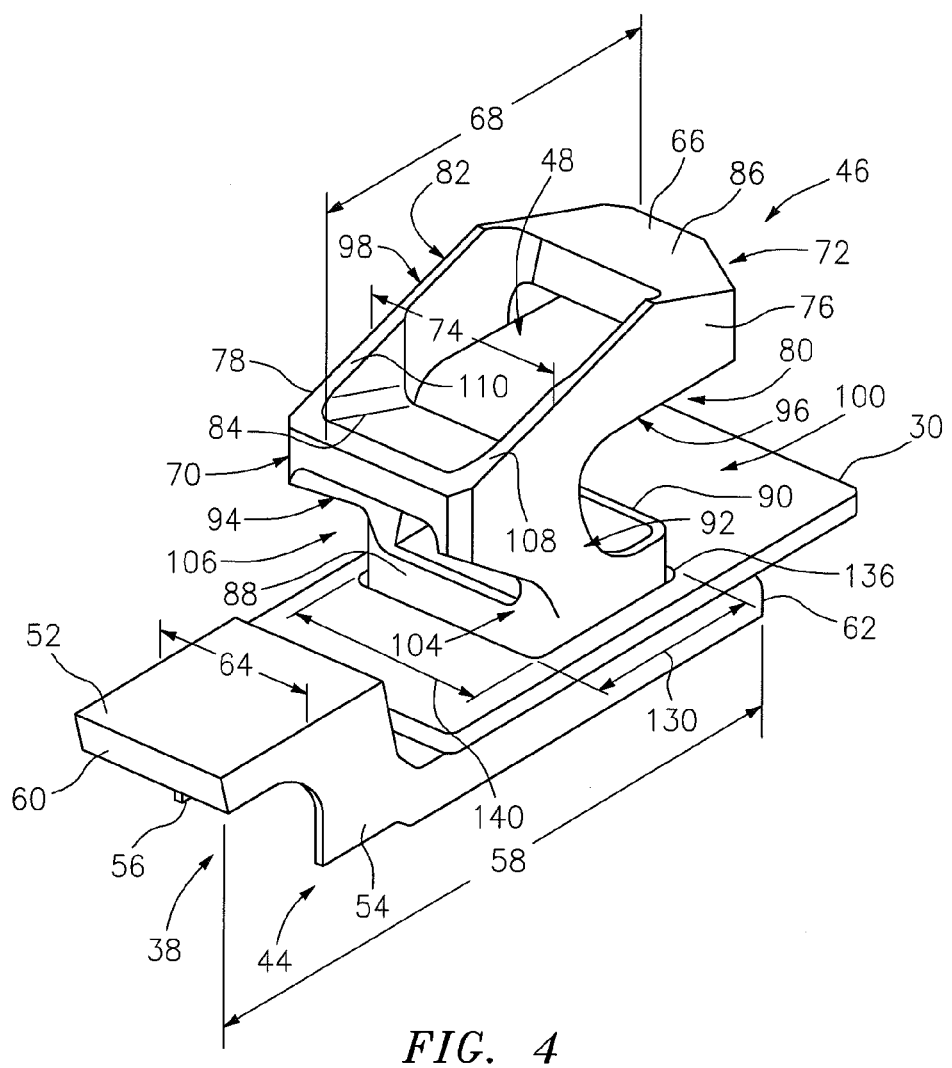
FIG. 4 is a partial perspective illustration of a flanged trailing edge box and an augmentor duct case included in the augmentor section illustrated in FIG. 2.
Figure 2:
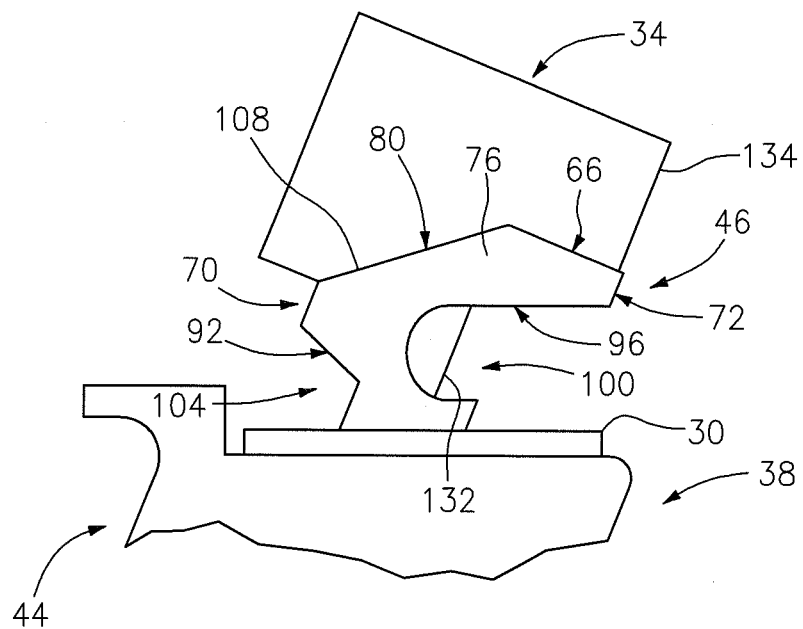
FIG. 2 is a partial side illustration of an augmentor section included in the gas turbine engine illustrated in FIG. 1.
Figure 3:
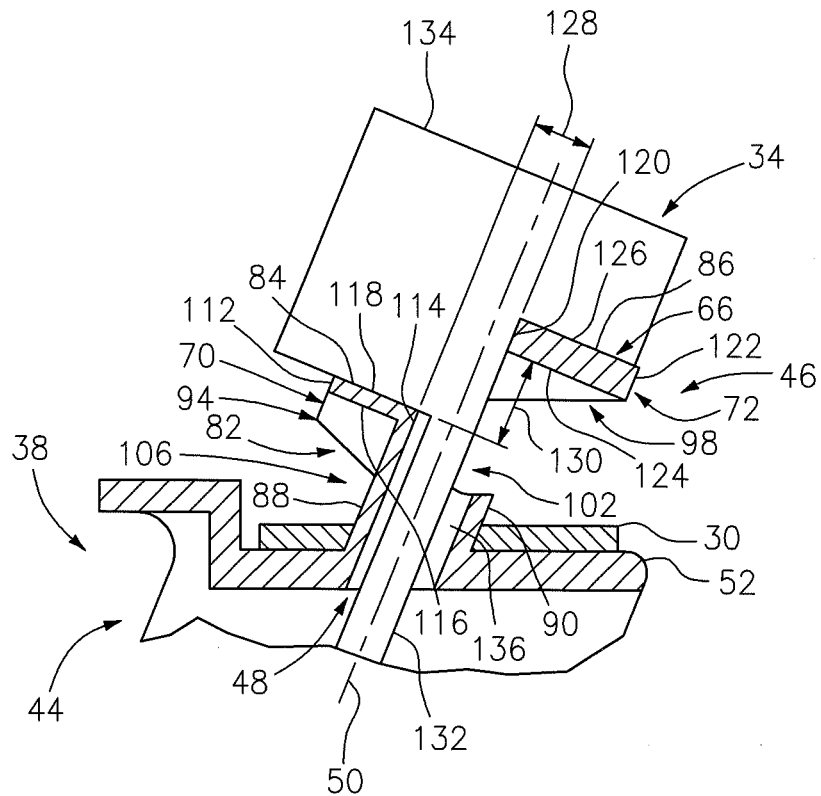
FIG. 3 is a partial side-sectional illustration of the augmentor section illustrated in FIG. 2.

Referring to FIGS. 2-4, the trailing edge box 38 may include a trailing edge box body 44 (e.g., a type of apparatus body), a flanged mount 46 and a fuel delivery system channel 48 that extends vertically (e.g., substantially radially) along a vertical axis 50 (see FIG. 3). Referring to FIG. 4, the trailing edge box body 44 may include a box outer platform 52 that is connected between a first box sidewall 54 and a second box sidewall 56. The box outer platform 52 has a first longitudinal length 58 that extends longitudinally (e.g., substantially axially) between a first platform side 60 and a second platform side 62. The box outer platform 52 also has a first lateral width 64 that extends laterally (e.g., substantially circumferentially) between the first box sidewall 54 and the second box sidewall 56.

The flanged mount 46 extends vertically from the box outer platform 52 to a distal mount end 66. The flanged mount 46 has a second longitudinal length 68 that extends longitudinally between a first mount side 70 and a second mount side 72. The flanged mount 46 also has a second lateral width 74 that extends laterally between a third mount side 76 and a fourth mount side 78, and that may be less than or equal to the first lateral width 64. The flanged mount 46 may include one or more support pylons 80 and 82, a first mounting flange 84, a second mounting flange 86, a first mount sidewall 88 and a second mount sidewall 90.

Referring again to FIGS. 2-4, the first support pylon 80 may form the third mount side 76, and the second support pylon 82 may form the fourth mount side 78. Each support pylon 80, 82 may have a hook-shaped geometry, and respectively include a first pylon segment 92, 94, a second pylon segment 96, 98, a first routing notch 100, 102 and a second routing notch 104, 106. Each first pylon segment 92, 94 is cantilevered from (e.g., off of) the trailing edge box body 44. Each first pylon segment 92, 94 may extend generally diagonally (e.g., in a first vertical direction and a first longitudinal direction) from the box outer platform 52 to the first mounting flange 84 and the first mount side 70. Each second pylon segment 96, 98 is cantilevered from the first pylon segment 92, 94. Each second pylon segment 96, 98 may extend generally diagonally (e.g., in the first vertical direction and a second longitudinal direction opposite the first longitudinal direction) from the first mounting flange 84 and the first mount side 70 to the second mounting flange 86, the second mount side 72 and the distal mount end 66. Each second pylon segment 96, 98 may respectively include an outside surface 108, 110 that slopes (e.g., is beveled or curved), for example, from the first mount side 70 to the distal mount end 66. Each first routing notch 100, 102 extends respectively into the support pylon 80, 82 in the first longitudinal direction, and vertically between the first pylon segment 92, 94 and the second pylon segment 96, 98. Each first routing notch 100, 102 may also respectively extend vertically between the box outer platform 52 and the second pylon segment 96, 98. Each second routing notch 104, 106 extends respectively into the support pylon 80, 82 in the second longitudinal direction, and vertically between the box outer platform 52 and the first pylon segment 92, 94.

Referring to FIG. 4, the first mounting flange 84 and the second mounting flange 86 each extend laterally between the first support pylon 80 and the second support pylon 82, and may be respectively configured as substantially parallel plates or tabs. Referring to FIG. 3, the first mounting flange 84 may extend longitudinally from an outside end 112 at the first mount side 70 to an inside end 114, and vertically between a first surface 116 and a second surface 118. The second mounting flange 86 may extend longitudinally from an inside end 120 to an outside end 122 at the second mount side 72, and vertically between a first surface 124 and a second surface 126. The inside end 120 is separated from the inside end 114 by a longitudinal distance 128. The first surface 124 is separated from the second surface 118 by a vertical distance 130. The second mounting flange 86 therefore is longitudinally and vertically offset (e.g., spaced) from the first mounting flange 84.

Referring to FIG. 4, the first mount sidewall 88 and the second mount sidewall 90 each extend laterally between the first support pylon 80 and the second support pylon 82. Referring to FIG. 3, the first mount sidewall 88 extends vertically from the box outer platform 52 to the inside end 114. The second mount sidewall 90 extends vertically from the box outer platform 52 to outside corners between the first pylon segments 92 and 94 and the first routing notches 100 and 102.

The channel 48 extends vertically through the flanged mount 46 and the box outer platform 52, and into the trailing edge box 38. The channel 48 extends longitudinally between the inside ends 114 and 120 as well as between the first mount sidewall 88 and the second mount sidewall 90. Referring to FIG. 4, the channel 48 also extends laterally between the first support pylon 80 and the second support pylon 82.

Referring to FIGS. 2 and 3, the fuel delivery system 34 may include a spray bar assembly 132 that extends vertically from a fuel distributor 134. An example of a fuel delivery system is disclosed in U.S. Pat. No. 5,685,140, which is hereby incorporated by reference, and is assigned to the assignee of the present invention. The present invention, however, is certainly not limited to any particular fuel delivery system configuration.

The fuel distributor 134 may be connected to the second surface 118 and the second surface 126. The spray bar assembly 132 extends through the channel 48 and into the trailing edge box 38. The first pylon segments 92 and 94 extend vertically through an aperture 136 (e.g., a rectangular aperture) in the outer duct case 30. Referring to FIG. 4, the aperture 136 has a third longitudinal length 138 that is less than the first longitudinal length 58 and the second longitudinal length 68. The aperture 136 also has a third lateral width 140 that may be less than the first lateral width 64, and greater than the second lateral width 74. The box outer platform 52 is located adjacent to (e.g., abutted against) and may be fastened to the outer duct case 30.

Figure 5:
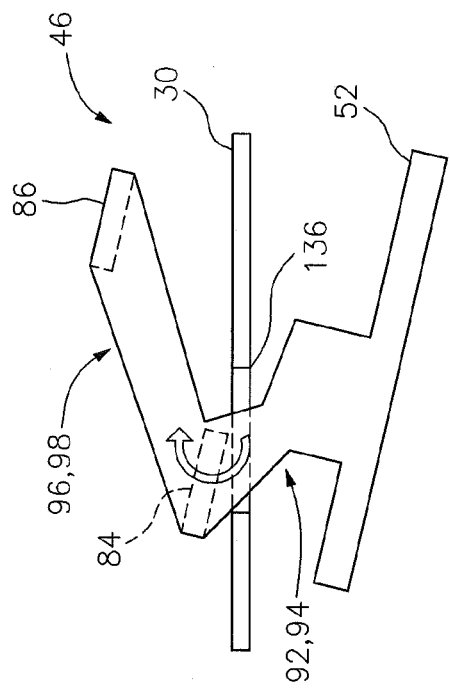
FIG. 5 is a partial, side-sectional illustration of an alternative flanged trailing edge box and augmentor duct case during a first step in an assembly process.
Figure 6:
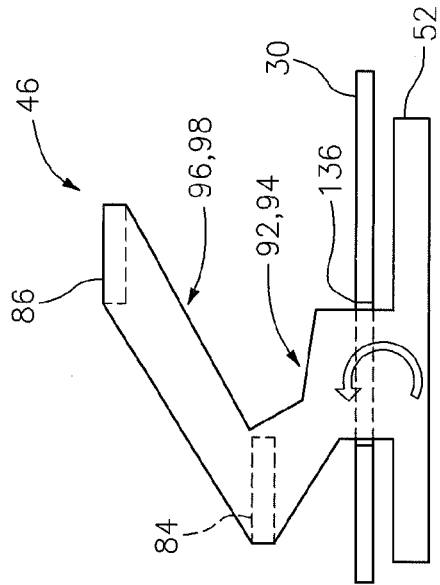
FIG. 6 is a partial, side-sectional illustration of the alternative flanged trailing edge box and augmentor duct case during a second step in the assembly process.
Figure 7:
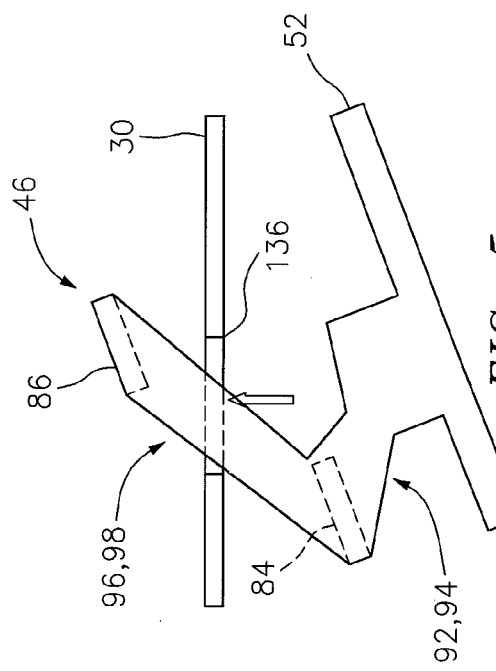
FIG. 7 is a partial, side-sectional illustration of the alternative flanged trailing edge box and augmentor duct case during a third step in the assembly process.
Figure 8:
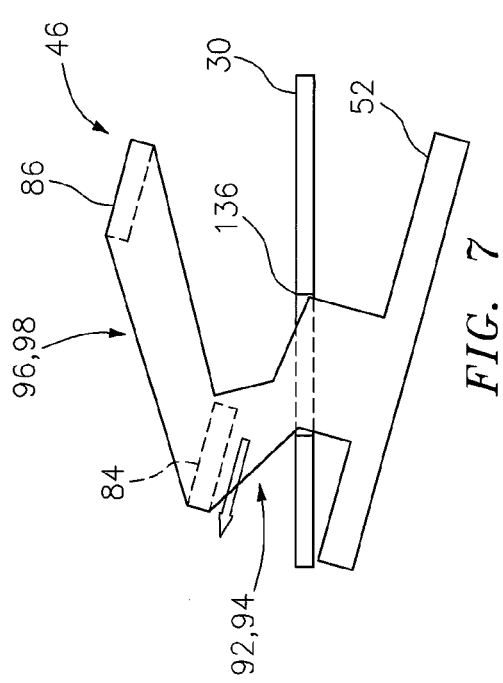
FIG. 8 is a partial, side-sectional illustration of the alternative flanged trailing edge box and augmentor duct case during a fourth step in the assembly process.

FIGS. 5-8 illustrate sequential assembly steps for routing (e.g., passing) the flanged mount 46 through the aperture 136. Referring to FIG. 5, for example, the flanged mount 46 may be moved in the first vertical direction and the second longitudinal direction to route the second mounting flange 86 and the second pylon segments 96 and 98 through the aperture 136. Referring now to FIG. 6, for example, the flanged mount 46 may be rotated in a clockwise direction and moved in the first vertical direction to route the first mounting flange 84 through the aperture 136. Referring to FIG. 7, for example, the flanged mount 46 may be moved in the first vertical direction and the first longitudinal direction to route the first pylon segments 92 and 94 through the aperture 136. Referring finally to FIG. 8, the flanged mount 46 may be rotated in a counter clockwise direction and moved in the first vertical direction to seat the first pylon segments 92 and 94 in the aperture 136 and position the box outer platform 52 adjacent to the outer duct case 30.

While various embodiments of the present invention have been disclosed above in reference to a gas turbine engine augmentor, it will be apparent to those of ordinary skill in the art that the flanged mount may be utilized in various alternative apparatuses and systems, and for various alternative non-augmentor and non-turbine engine applications. In addition, a person of ordinary skill in the art will also recognize that the one or more support pylons may have various alternative (e.g., hooked) geometries. Accordingly, the present invention is not to be restricted except in light of the attached claims and their equivalents.

What is claimed is:

1. A flanged apparatus, comprising:
   an apparatus body; and
   a flanged mount comprising a support pylon, a first mounting flange and a second mounting flange, the support pylon comprising
   a first pylon segment that is cantilevered from the apparatus body, and that extends to the first mounting flange;

a second pylon segment that is cantilevered from the first pylon support, and that extends from the first mounting flange to the second mounting flange; and a routing notch that extends vertically between the first pylon segment and the second pylon segment, and vertically between the apparatus body and the second pylon segment; and a second routing notch that extends vertically between the apparatus body and the first pylon segment;

wherein the first mounting flange and the second mounting flange extend laterally from the support pylon, and the first mounting flange is separated from the second mounting flange by a longitudinal distance and a vertical distance.

2. The flanged apparatus of claim 1, wherein the flanged mount extends vertically between the apparatus body and a distal mount end, and longitudinally between a first mount side and a second mount side; and the second pylon comprises an outside surface that slopes from the first mount side to the distal mount end.

3. The flanged apparatus of claim 1, wherein the first pylon segment and the second pylon segment provide the support pylon with a hook-shaped geometry.

4. The flanged apparatus of claim 1, further comprising a second support pylon comprising a first pylon segment that is cantilevered from the apparatus body, and that extends to the first mounting flange;

a second pylon segment that is cantilevered from the first pylon segment of the second support pylon, and that extends from the first mounting flange to the second mounting flange; and a second routing notch that extends vertically between the first pylon segment of the second support pylon and the second pylon segment of the second support pylon;

wherein the first mounting flange and the second mounting flange extend laterally between the support pylon and the second support pylon.

5. The flanged apparatus of claim 4, wherein a channel extends vertically through the flanged mount, longitudinally between the first mounting flange and the second mounting flange and laterally between the support pylon and the second support pylon, and into the apparatus body.

6. The flanged apparatus of claim 5, wherein the flanged mount further comprises a first sidewall that extends vertically from the apparatus body to the first mounting flange and laterally between the support pylon and the second support pylon; and a second sidewall that extends laterally between the support pylon and the second support pylon;

wherein the channel extends longitudinally between the first sidewall and the second sidewall.

7. The flanged apparatus of claim 1, wherein the apparatus body comprises a trailing edge box for a gas turbine engine augmentor.

8. A flanged assembly, comprising:

a first apparatus comprising an aperture extending vertically therethrough, the aperture comprising a first longitudinal length; and a flanged second apparatus comprising a flanged mount that mates with the aperture and extends vertically from an apparatus body, the flanged mount comprising a second longitudinal length, a support pylon, a first mounting flange and a second mounting flange, the support pylon comprising a first pylon segment that is cantilevered from the apparatus body, and that extends through the aperture to the first mounting flange;

a second pylon segment that is cantilevered from the first pylon support, and that extends from the first mounting flange to the second mounting flange; and a routing notch that extends vertically between the first pylon segment and the second pylon segment;

wherein the first mounting flange and the second mounting flange extend laterally from the support pylon, and the first mounting flange is separated from the second mounting flange by a longitudinal distance and a vertical distance; and wherein the second longitudinal length extends from respective outside ends of the first mounting flange and the second mounting flange, and is greater than the first longitudinal length.

9. The flanged assembly of claim 8, wherein the apparatus body comprises a third longitudinal length that is greater than the first longitudinal length.

10. The flanged assembly of claim 8, further comprising a second routing notch that extends vertically between the apparatus body and the first pylon segment.

11. The flanged assembly of claim 10, wherein the flanged mount extends vertically between the apparatus body and a distal mount end, and longitudinally between a first mount side and a second mount side; and the second pylon comprises an outside surface that slopes from the first mount side to the distal mount end.

12. The flanged assembly of claim 10, wherein the routing notch extends vertically between the apparatus body and the second pylon segment.

13. The flanged assembly of claim 8, further comprising a second support pylon comprising a first pylon segment that is cantilevered from the apparatus body, and that extends to the first mounting flange;

a second pylon segment that is cantilevered from the first pylon segment of the second support pylon, and that extends from the first mounting flange to the second mounting flange; and a second routing notch that extends vertically between the first pylon segment of the second support pylon and the second pylon segment of the second support pylon;

wherein the first mounting flange and the second mounting flange extend laterally between the support pylon and the second support pylon.

14. The flanged assembly of claim 13, wherein a channel extends vertically through the flanged mount, longitudinally between the first mounting flange and the second mounting flange and laterally between the support pylon and the second support pylon, and into the apparatus body.

15. The flanged assembly of claim 14, wherein the flanged mount further comprises a first sidewall that extends vertically from the apparatus body to the first mounting flange and laterally between the support pylon and the second support pylon; and a second sidewall that extends laterally between the support pylon and the second support pylon;

wherein the channel extends longitudinally between the first sidewall and the second sidewall.

16. The flanged assembly of claim 8, wherein the first pylon segment and the second pylon segment provide the support pylon with a hook-shaped geometry.

17. The flanged assembly of claim 8, wherein the apparatus body comprises a trailing edge box for a gas turbine engine augmentor.

18. The flanged assembly of claim 17, wherein the first apparatus comprises a circumferentially extending augmentor duct case.

* * * * *